235-379
E113A OR 4,023 SR
T235/380

United States Patent [19] 4,023,012
Ano et al. [45] May 10, 1977

[54] SYSTEM FOR VERIFYING THE USER OF A CARD

[75] Inventors: Shizuya Ano, Kyoto; Yasuo Uchida, Osaka, both of Japan

[73] Assignee: Omron Tateisi Electronics Co., Kyoto, Japan

[22] Filed: June 30, 1975

[21] Appl. No.: 591,465

[30] Foreign Application Priority Data

| | | |
|---|---|---|
| July 8, 1974 | Japan | 49-78481 |
| July 8, 1974 | Japan | 49-78482 |
| July 8, 1974 | Japan | 49-78483 |
| July 8, 1974 | Japan | 49-78484 |

[52] U.S. Cl. .................... 235/61.7 B; 235/61.11 D; 340/149 A

[51] Int. Cl.² .................... G06K 17/00; G06K 7/00

[58] Field of Search ............... 235/61.7 B, 61.11 D; 340/149 A

[56] References Cited

UNITED STATES PATENTS

| | | | |
|---|---|---|---|
| 3,401,830 | 9/1968 | Mathews | 235/61.7 B |
| 3,513,441 | 5/1970 | Schwend | 235/61.7 B |
| 3,581,063 | 5/1971 | Leuasseur | 235/61.7 B |
| 3,665,162 | 5/1972 | Yamamoto et al. | 235/61.7 B |
| 3,740,530 | 6/1973 | Hoffer et al. | 235/61.7 B |
| 3,761,682 | 9/1973 | Barnes et al. | 235/61.7 B |
| 3,764,742 | 10/1973 | Abbott et al. | 235/61.7 B |
| 3,786,420 | 1/1974 | Stambler | 235/61.7 B |
| 3,846,622 | 11/1974 | Meyer | 235/61.7 B |
| 3,862,716 | 1/1975 | Black et al. | 235/61.7 B |

*Primary Examiner*—Vincent P. Canney
*Attorney, Agent, or Firm*—Christensen, O'Connor, Garrison & Havelka

[57] ABSTRACT

A system for verifying the user of a card in an automatic banking system and the like, wherein when a card is used for the first time after issuance, the user of the card himself manipulates the machine to input a secret number he intends to use with the card so that strict secrecy of the secret number can be maintained. The balance of the use's account is utilized for checking the correctness of the secret number when the card is used after the first use thereof.

14 Claims, 9 Drawing Figures

SYSTEM FOR VERIFYING THE USER OF A CARD

This invention relates to a system for verifying the user of a card.

Verification of the user of a card is esential in a POS (point of sales) system, a security gate system or a banking system. In known systems, generally the user of a card is previously given a predetermined secret number. When he uses the card in the system, he is requested to manually enter his secret number into the system, and at the same time the secret number is read from the card or a suitable memory device to which access is made by the card. For identification of the user of the card the manually entered secret number and the secret number read from the card or the memory device are compared to see if there exists a predetermined relation (typically, coincidence) between the two numbers.

In the prior art, to be given a secret number the customer tells the clerk in charge a number he desires to have, and the clerk enters the number into the card issuing machine so as to be recorded on the card to be issued to the customer. As a result, the secret number that should not be known to any other person than the owner of the card is known to the clerk in charge of the card issuing operation so that complete secrecy of the secret number cannot be maintained.

The primary object of the invention is therefore to provide a system for verifying the user of a card used in a banking system and the like, which is capable of maintaining strict secrecy of the secret number given to each card owner.

Another object of the invention is to provide such a verification system as aforesaid, wherein when a card is issued to a customer, he need not tell his selected secret number to the clerk in charge of the card issuing machine, but the secret number is recorded on the card by the operation of the customer himself.

Another object of the invention is to provide such a verification system as aforesaid, wherein when a card is issued, it has no secret number recorded thereon, and when the card is used for the first time, the user of the card manually enters a secret number to be recorded on the card, thereby maintaining strict secrecy of the secret number.

Another object of the invention is to provide such a verification system as aforesaid, wherein even when the numbers recorded on the card are known to a third person, the card cannot be used improperly by the third person, thereby maintaining the secrecy of the secret number.

Another object of the invention is to provide such a verification system as aforesaid, wherein when the card is used, the numbers recorded on the card are changed to different numbers which have a predetermined relation to the secret number memorized by the user of the card, thereby maintaining the secrecy of the secret number.

To accomplish the above objects, in accordance with the invention, when a card is issued to a customer, the customer need not tell any secret number to the clerk in charge, so that no secret number is recorded on the card issued. Instead the card has certain numbers recorded thereon. When operations are conducted on those numbers by predetermined equations, the number obtained indicates that the card has not been previously used.

When the card is used for the first time, the user of the card manually inputs the secret number for the first time. If the card is recognized as being used for the first time, the secret number is not checked, or even when it is checked, the result of the checking is neglected. In other words, when the card is used for the first time, the user is considered as the proper owner of the card.

The manually entered secret number is not recorded as it is but a code is obtained by predetermined functional equations from that number and a different number recorded on the card, such as for example, the bank number, the account number on the balance and the code thus obtained is recorded on the card.

If the code is determined by at least the balance of a savings account, the balance is changed every time the card is used, so that the code is also changed every time the card is used.

Once the card has been used, the above-mentioned code is recorded on the card. When the card is used next time, a secret number is calculated by the predetermined functional equations from the above-mentioned code and at least one of the bank number, the account number, the bank cipher and the balance, and the secret number thus obtained is compared with the memorized secret number manually entered by the user of the card to check correspondence therebetween for identification of the user.

Since the above code is changed every time the card is used, it is impossible for a third person who happens to know all the numbers recorded on the card to know the secret number that the owner of the card memorizes.

If the records on the card are unjustly changed to increase the balance, the manually entered secret number will not coincide with the secret number calculated in the above manner unless the above-mentioned code is changed so as to satisfy the above-mentioned equations. This helps prevent fradulent use of the card by alternation of the balance.

The invention will be described in detail with reference to the accompanying drawings showing preferred embodiments of the invention, wherein.

Figure 1:
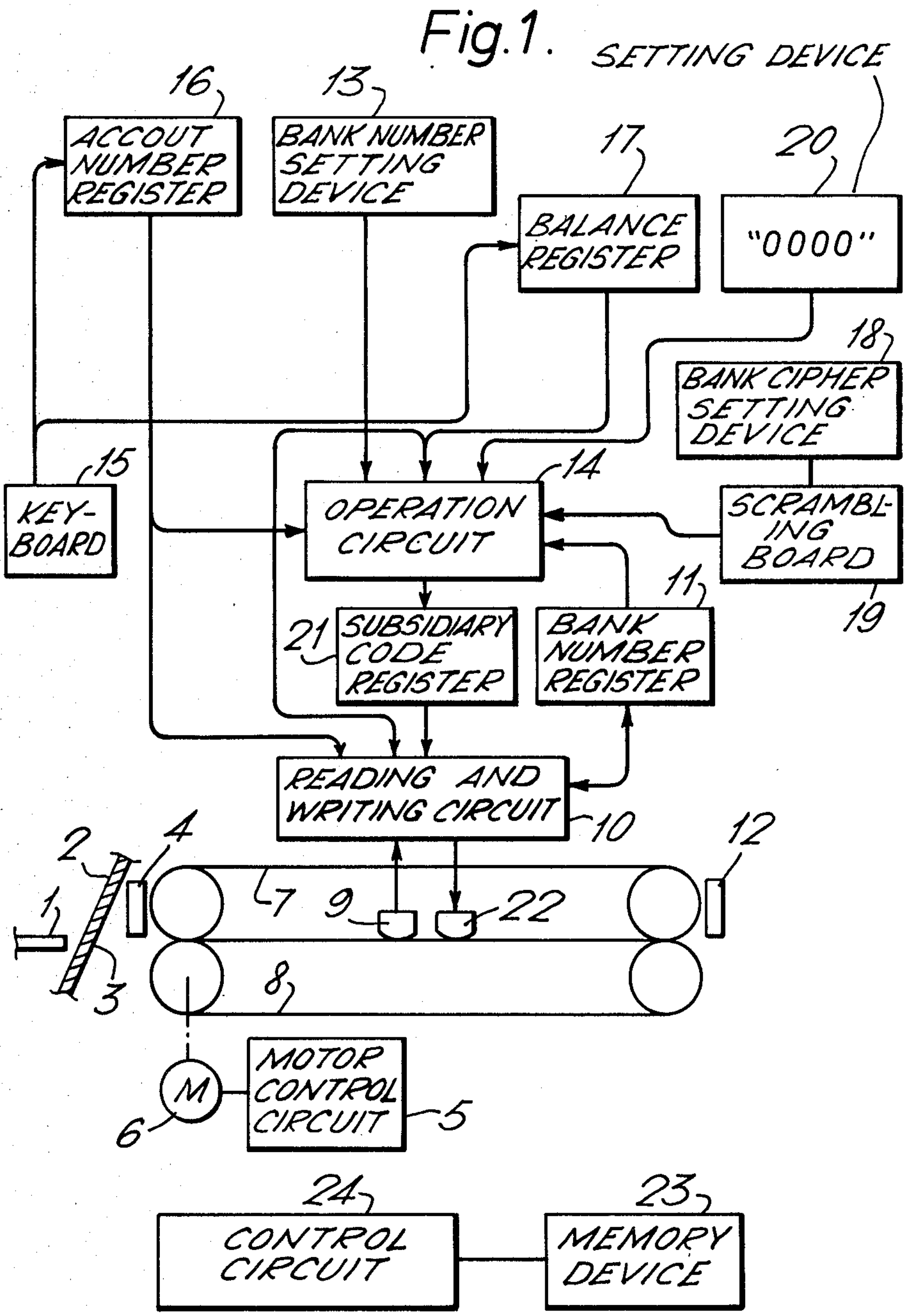
FIG. 1 is a block diagram of a card issuing apparatus for issuing cards for use in an off-line cash dispenser.

Referring to the drawings, first, to FIGS. 1 to 5 which show one embodiment of the invention as applied to an off-line cash dispenser (to be referred to simply as the off-line CD), the card which is to be issued to a customer has a bank number already magnetically recorded thereon. Other data also are to be recorded on the card, but the area in which such data other than the bank number are to be recorded has 0 recorded thereon. This arrangement is followed because the bank number is the information to be commonly recorded on all the cards to be issued, and it is more efficient to record it on the cards collectively at the head office of the bank. More importantly, this arrangement enables the head office of the bank. More importantly, this arrangement enables the head office of the bank to strictly supervise issuance of new cards to customers at its branches, and thereby prevent improper issuance of new cards.

In the card issuing device shown in FIG. 1, when a card is to be issued, a clerk in charge puts a card 1 into a slot 3 formed in the front panel 2 of the card issuing machine. (In the following description reference should also be made to the flow chart shown in FIG. 4.) When a first photodetector 4 detects the foward edge of the card, the detector 4 produces a detection signal to be applied to a motor control circuit 5, whereupon a motor 6 is rotated to cause a pair of belts 7 and 8 to pull in the card 1 rightward in FIG. 1.

As the card is pulled in, a magnetic reading head 9 reads the bank number previously recorded on the card to produce a corresponding signal. The signal is converted to a digital signal by a reading and writing circuit 10 (to be referred to as the R/W circuit hereinafter) and stored in a bank number register 11.

When the forward edge of the card reaches a second photodetector 12, it produces a signal that causes the motor control circuit 5 to stop the rotation of the motor 6.

The bank number read from the card and stored in the bank number register 11 is checked to see if it is a predetermined bank number. For this purpose, a bank number setting device 13 is provided and has a predetermined bank number set therein. The bank number setting device 13 may comprise a rotary switch or an integrated read-only memory (to be referred to as ROM). The bank number set in the bank number setting device 13 and the bank number stored in the bank number register 11 are compared by an operation or arithmetic circuit 14 to see if they coincide.

If the two numbers do not coincide, the operation circuit 14 produces a corresponding output signal that causes the motor control circuit 5 to rotate the motor 6 in the reverse direction so that the card is carried by the belts 7 and 8 back to the slot 3. At this time a red lamp not shown but provided on the front panel is lit. Since the card is not one issued by an authorized bank, the lighting of the red lamp means that the card is not to be issued to a customer.

If the two numbers, i.e., the one in the bank number setting device 13 and the one stored in the bank number register 11, coincide, a green lamp (not shown but provided on the front panel) is lit to indicate that the card is a proper one which can be issued to the customer, whereupon the clerk enters through a keyboard 15 an account number allotted to the customer to whom the card is to be issued and the amount of money to be initially entered to the credit of the account (that is, the balance of the account at the time the card is issued).

The account number and the balance (that is the amount initially deposited) entered through the keyboard 15 are initially stored in registers 16 and 17, respectively. It is assumed that the bank number, the account number and the balance comprise a four-digit decimal number, an eight-digit decimal number, and a four-digit decimal number, respectively. In a bank cipher setting devie 18 a bank cipher is set by an autorized person, e.g. the chief of the branch of the bank at which the card issuing machine is installed. Once the bank cipher has been set, it will not be changed except in special circumstances. Different banks have different bank ciphers.

The bank cipher is scrambled by a scrambling board 19 and then applied to the operation circuit 14. The scrambling board may comprise a relatively simple wiring connection or a diode matrix circuit. The more complicated it is, the better.

Figure 3:
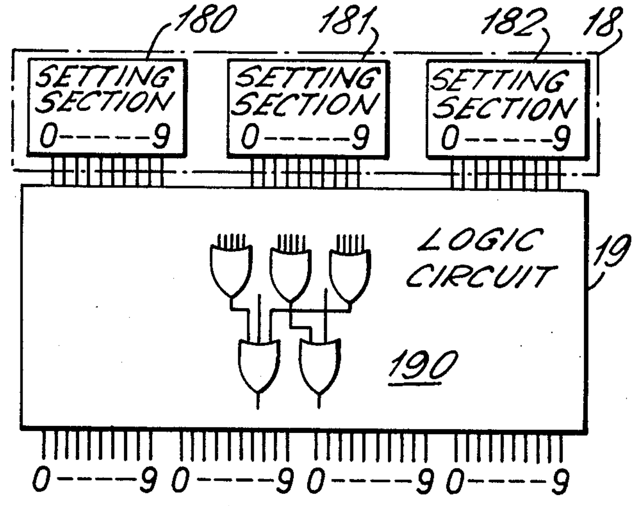
FIG. 3 is a detailed block diagram of the scrambling board shown in FIG. 1.
Figure 4:
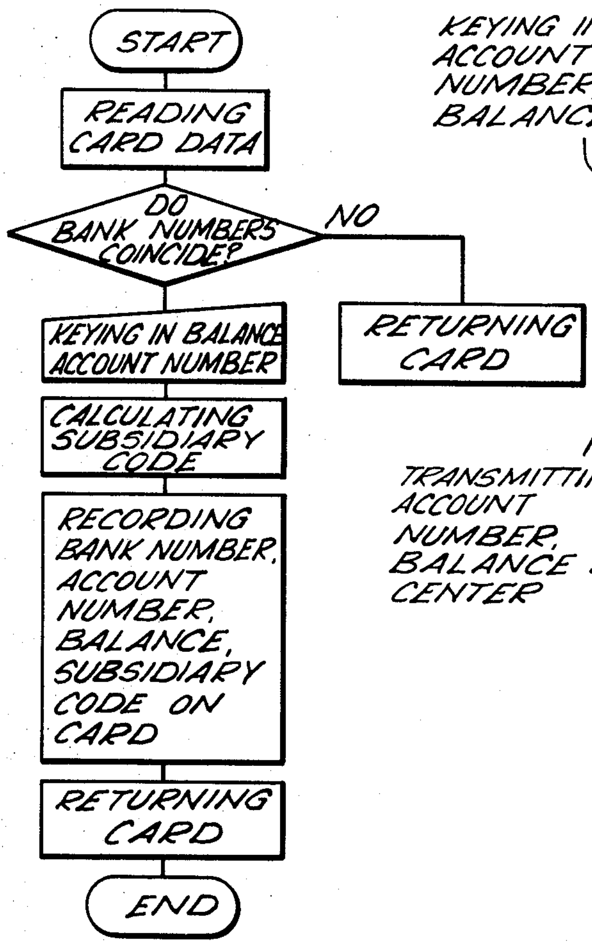
FIG. 4 is a flow chart for the operation of the card issuing apparatus of FIG. 1.

FIG. 3 shows one example of the scrambling circuit in detail. The bank cipher setting device 18 comprises three subsidiary setting sections 180, 181 and 182, by which a three-digit decimal number is set. The outputs from the three subsidiary setting sections 180, 181 and 182 are applied to an extremely complicated logic circuit 190, which scrambles the three-digit number to produce at its output a four-digit number. In FIG. 3 the output is shown as 0 . . . 9 for convenience of illustration, but actually it comprises, for example, a BCD code.

Returning to FIG. 1, a third setting device 20 has set therein a four-digit decimal secret number. It is assued that when a new card is to be issued, the secret number is set as 0000.

If each digit of each of the above-mentioned five numbers is expressed by an alphabetic letter suffixed with a decimal number, the following will result, with a smaller suffixed number expressing a higher place in each number.

The bank number: B1 – B4
The account number: A1 – A8
The balance: R1 – R4
The secret number: Q1 – Q4
The bank cipher: H1 — H4 wherein the bank cipher is the output of the scrambled board 19.

The following relations may be set to exist between the digits which constitute the above numbers.

$$Q1 \times B1 + A1 + A5 + R1 + H1 + C1$$
$$Q2 \times B2 + A2 + A6 + R2 + H2 + C2$$
$$Q3 \times B3 + A3 + A7 + R3 + H3 + C3$$
$$Q4 \times B4 + A4 + A8 + R4 + H4 + C4$$

wherein C1 – C4 are set to express the four digits of a four-digit decimal subsidiary code number necessary to meet the criteria defined by the equations.

Each digit of the numbers in the above equations is a positive integral number, and both carries and borrows are ignored when operations are conducted.

After the account number and the balance have been entered through the keyboard 15, the operation circuit 14 calculates a subsidiary code C1 – C4 on the basis of the above equations. Since Q1 – Q4 are all 0, C1 – C4 is the only unknown number in each of the equations so that it is easy to calculate the subsidiary code C1 – C4. The code that has been calculated is stored in a subsidiary code register 21.

After the subsidiary code has been stored in the subsidiary code register 21, the belts 7 and 8 are rotated in the reverse direction. As the card is carried backward, the R/W circuit 10 records the bank number, the account number, the balance and the subsidiary code stored in the registers 11, 16, 17 and 21, respectively, on the card through a writing head 22. The card is returned through the slot 3.

Thus the operation of the apparatus for issuing a new card has been finished. The operation is controlled by means of a control circuit 24 which addresses, decodes and carries out an instruction program stored in a memory device 23. The techniques for such control are well known as the fundamental techniques for controlling electronic computers, so that no detailed explanation thereof will be given.

Figure 2:
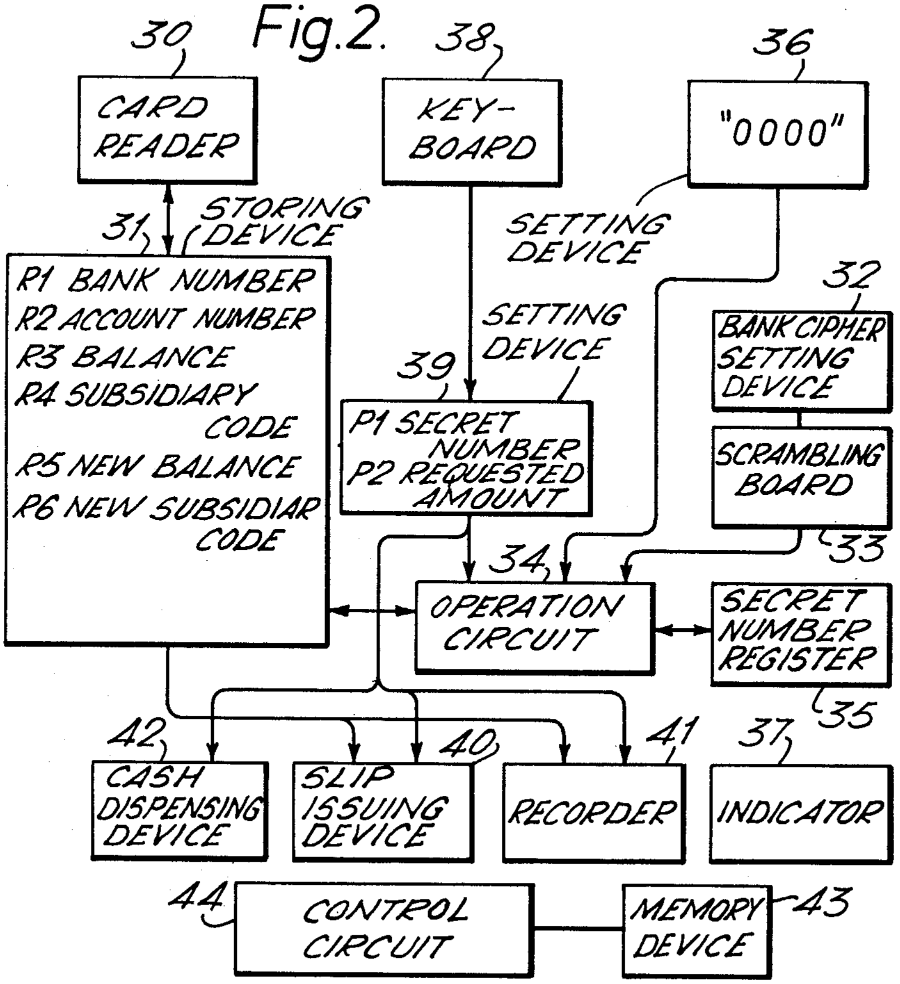
FIG. 2 is a block diagram of the off-line cash dispenser.

It should be particularly noted in the above card issuing operation that the customer need not tell the clerk his secret number and, therefore, immediately after the card has been issued, the secret number selected by the customer or any other corresponding number is not yet recorded on the card. As will be described later, the secret number is recorded by the owner of the card himself, so that there is no chance for the clerk in charge to know the secret number, thereby reducing the possibility of improper use of the card. The secret number selected by the customer is manually entered by himself when he uses the card in a cash dispenser for the first time. FIG. 2 is a block diagram of a cash dispenser.

The data on the card that has been inserted into the cash dispenser by the customer are read by a card reader 30. The read data, that is, the bank number, the account number, the balance and the subsidiary code are stored in the registers R1, R2, R3 and R4, respectively, of a storing device 31.

The cash dispenser is provided with a bank cipher setting device 32 and a scrambling board 33 which are of the same construction as in FIG. 1. The bank cipher for the same bank is set in the bank cipher setting device 32, so that the scrambling board 33 produces the same output H1 – H4 as in the previously mentioned card issuing device in FIG. 1.

After the bank number, the account number, the balance and the subsidiary code have been stored in the registers R1, R2, R3 and R4, an operation or arithmetic circuit 34 calculates a secret number Q1 – Q4 from this data, using the previously described equations. The secret number is stored in a secret number register 35. If the card has been used for the first time, the digits of the secret number must be all zeros.

Then in order to check if the digits Q1 – Q4 of the secret number are all zeros, the operation circuit 34 compares the output of the secret number register 35 and that of the setting device 36 which is all zeros. Coincidence of the two outputs means that the card is now being used for the first time because as previously mentioned when the card was issued the relation between the above-mentioned numbers was so predetermined that the secret number is 0000. If the two outputs do not coincide, it means that the card has already been used at least one time, as will be described again later.

If the two outputs coincide, that is, the secret number as stored in the secret number register 35 is 0000, an indicator 37 indicates "Please enter a four-digit secret number you intend to use with your card from now on", whereupon the customer enters through a keyboard 38 the four-digit secret number which he desires to use. This secret number is stored in a register P1 included in a storing device 39. Then the indicator 37 indicates "Please enter the amount of money you request", whereupon the customer enters through the keyboard 38 the amount of money he desired to be paid. The entered amount of money is stored in a register P2 in the storing device 39. The indicator 37 can be the well-known type that has an endless curtain on which the above-mentioned and other necessary indications are printed.

When the requested amount has been entered, the operation circuit 34 subtracts the requested amount stored in the register P2 from the balance stored in the register R3 to obtain a new balance to be stored in a register R5 included in the storing device 31. At the time of subtraction, the operation circuit 34 checks whether the value of the new balance is positive or negative. If it is negative, the balance is short of the requested amount of cash and the card is returned to the customer.

If the value of the new balance is positive so that the payment is allowed, the operation circuit 34 calculates a new subsidiary code C1 – C4 on the basis of the previously mentioned equations.

In this calculation, Q1 – Q4 in the equations are the four digits of the secret number entered by the customer and R1 – R4 are the numbers determined by the new balance stored in the register R5, so that the new subsidiary code C1 – C4 calculated by the operation circuit 34 is different from the subsidiary code when the card was issued. This new subsidiary code C1 – C4 is stored in a register R6 included in the storing device 31.

Then the bank number, the account number, the new balance and the new subsidiary code stored in the registers R1, R2, R5 and R6, respectively, are recorded on the card. It should be noted here that the subsidiary code is changed by the secret number entered for the first time and the new balance. When the card is used next time, the subsidiary code will be changed by the change of the balance alone, as will be described later.

A slip issuing device 40 then issues a slip on which the account number stored in the register R2, the new balance stored in the register R5 and the requested amount (that is, the amount of money that has been paid) stored in the register P2 are printed. A recorder 41, which can be a tape puncher, records the same data as those printed on the slip so that the recorded data will later be processed by a batch process.

The card the data of which have been renewed is returned to the customer together with the slip on which the data have been printed. A cash dispensing device 42 dispenses the number of bills which correspond to the requested amount of money as stored in the register P2. This completes the operation of the cash dispenser when the card has been used for the first time.

When the card is used for the second time or after that, the operation circuit 34 calculates a secret number Q1 – Q4 from the output of the scrambling device 33 and the card data stored in the storing device 31 on the basis of the previously mentioned equations. The secret number obtained is stored in the secret number register 35. Since the values Q1 – Q4 are not all zeros, the contents of the registers 35 and 36 disagree. The disagreement means that the use of the card is not the first use thereof. Then, unlike in the first use of the card, it is necessary to check the secret number entered by the customer. In order to perform this checking of the entered secret number, the operation circuit 34 compares the secret number entered by the customer through the keyboard 38 and stored in the register P1 with the secret number stored in the register 35 to see if the two secret numbers coincide.

If they do not coincide, the card is recognized as being improperly used so as to be returned to the user and the requested payment of cash is refused.

If the two secret numbers coincide, however, the card is recognized as being properly used by an authorized person, so that the indicator 37 indicates "Please input the amount you request." The operation of the system following that indication is quite the same as in the previously mentioned case in which the card was used for the first time. (See the flow chart shown in FIG. 5). That is, when the card is used for the second or more time, the subsidiary code is changed in accordance with the rewritten balance, so that when the card is used next time, the secret number Q1 – Q4 calculated by the operation circuit must necessarily coincide with the secret number entered initially by the customer.

If the customer has entered all 0's as the secret number when the card is used for the first time, the same operation as in the first use of the card takes place for the second use thereof. This would not cause so much inconvenience, but if the card is stolen and illegally used by an unauthorized person, entry of any secret number would cause the apparatus to operate. To avoid this, preferably the customer should be advised not to enter all zeros as the secret number when he uses the the card for the first time, and the program is so arranged that if nevertheless he has entered all zeros as the secret number, he is requested to do the operation over again.

The above-mentioned operation is controlled by a control circuit 44 on the basis of a predetermined program stored in a memory device 43. The techniques for such control are well known in the art as previously mentioned in connection with the card issuing apparatus shown in FIG. 1.

In the above the invention has been described as applied to an off-line cash dispenser. Another embodiment of the invention as applied to an on-line cash dispenser (to be referred to as the on-line CD) will next be described. The card for use in the on-line CD has recorded thereon the account number alone as the data by which access can be made to the balance, etc. stored in a center file.

Figure 8:
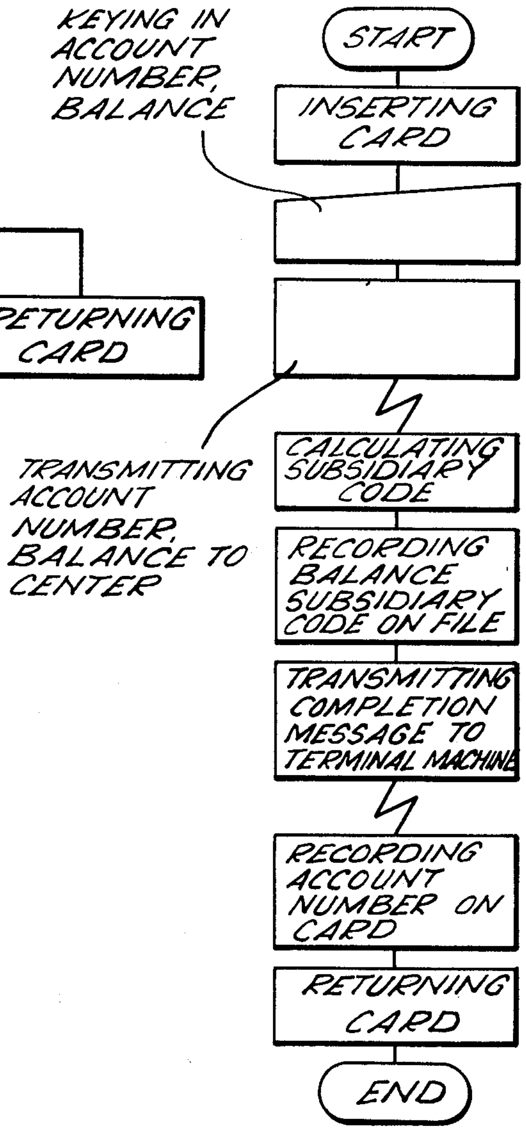
FIG. 8 is a flow chart for the operation of the card issuing apparatus of FIG. 6.
Figure 5:
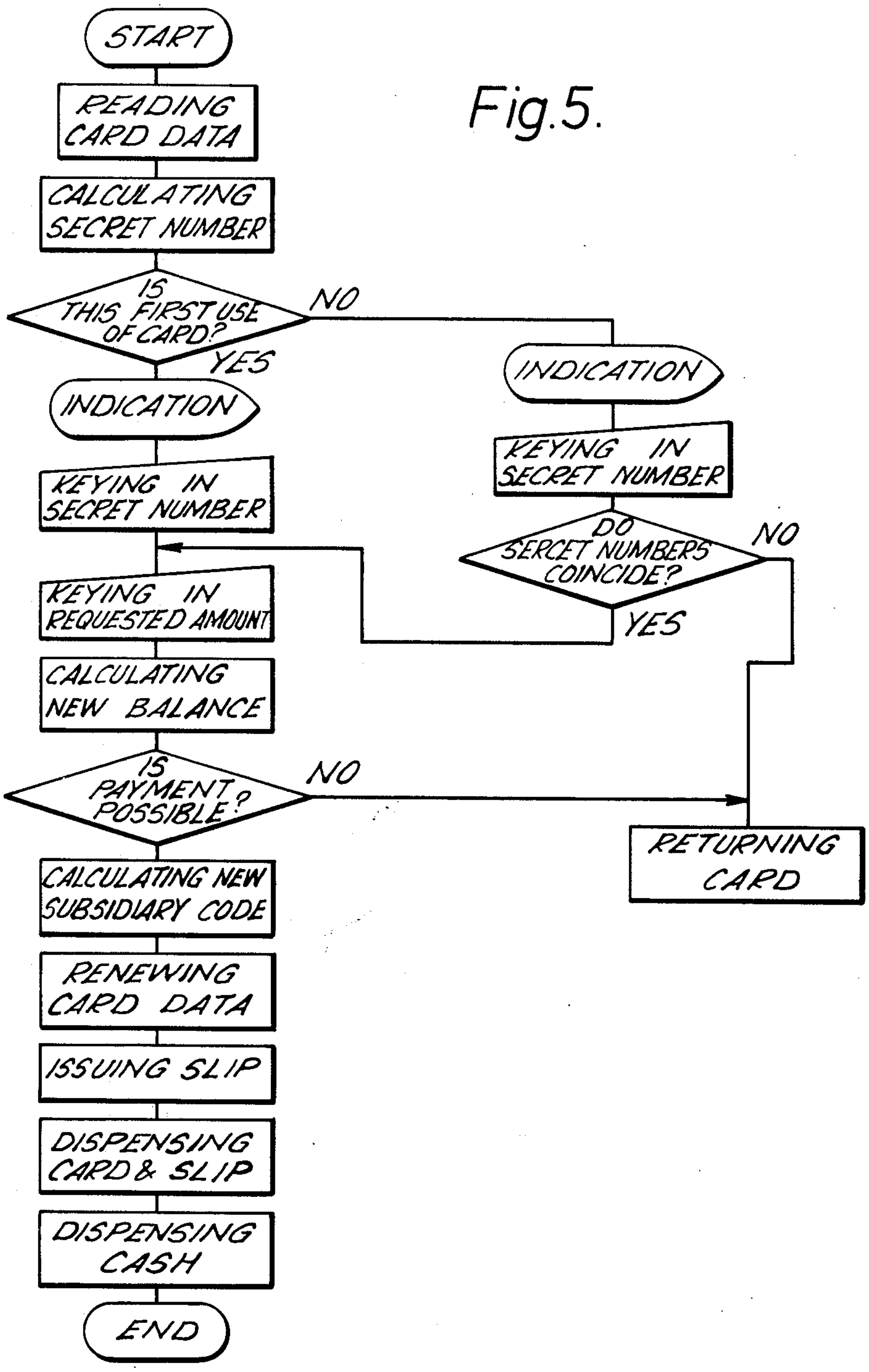
FIG. 5 is a flow chart of the operation of the cash dispenser of FIG. 2.
Figure 6:
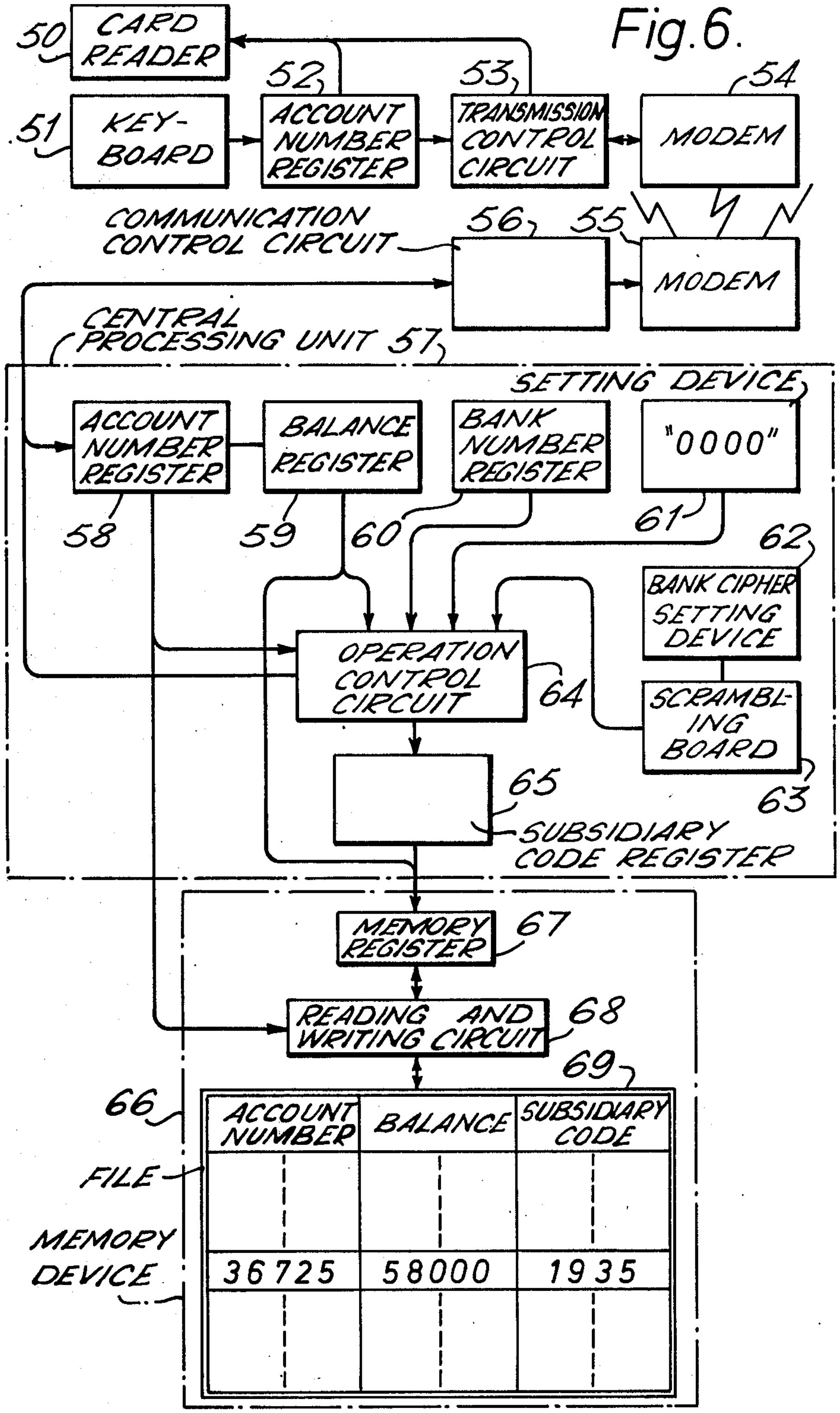
FIG. 6 is a block diagram of a card issuing apparatus for issuing cards for use in an on-line cash dispenser.

In the card issuing apparatus shown in FIG. 6, the clerk in charge puts into a card reader 50 a new card to be issued to a customer. The card is pulled in and stopped in the card reader. Then the clerk iputs through a keyboard 51 the account number allotted to the customer and the amount of money deposited to open the account, that is, the balance of the account, whereupon the account number and the balance are once stored in an account number register 52 and thence sent to a central station through a transmission control circuit 53 and a terminal MODEM 54. Reference should also be made to FIG. 8.

The account number and the balance sent from the terminal machine to the central station are applied through a MODEM 55 and a communication control circuit 56 to a central processing unit 57 (to be referred to as the CPU hereinafter) and stored in account number and balance registers 58 and 59, respectively.

In the CPU the bank number and all zeros are set in setting devices 60 and 61, respectively, and the bank cipher is set in a bank cipher setting device 62. A scrambling board 63 scrambles the bank cipher to produce a corresponding output. These setting devices 60, 61 and 62 and the scrambling board 63 corresponds to the setting device 13, 20 and 18 and the scrambling board 19 of FIG. 1, respectively.

After the account number and the balance have been stored in registers 58 and 59, an operation control circuit 64 (which will be referred to as the AR circuit hereinafter) calculates a subsidiary code C1 – C4 on the basis of the previously mentioned equations. The calculated code is stored in a subsidiary code register 65.

Then the balance stored in the balance register 59 is stored in a memory register 67 included in a memory device 66. A reading and writing circuit 68 operates so that access is made by the account number stored in the account number register 58 to the corresponding area in a file 69 so as to record the balance in that area. In a similar manner, the subsidiary code is also recorded in the area of the account. Typically, the file comprises a magnetic disk or a magnetic drum.

When the above recording of the balance and the subsidiary code in the corresponding area of the file has been completed, the AR circuit 64 produces a completion message, which is sent back to the terminal machine through the communication control circuit 56, the MODEM 55, the MODEM 54 and the transmission control circuit 53.

The card reader 50 receives the signal and operates to record the account number on the card and the card is returned to the customer. In this case, the balance is not recorded on the card. The operation of issuing a card has thus been completed.

How the on-line CD is operated by the card that has been issued in the above manner will now be described.

Figure 7:
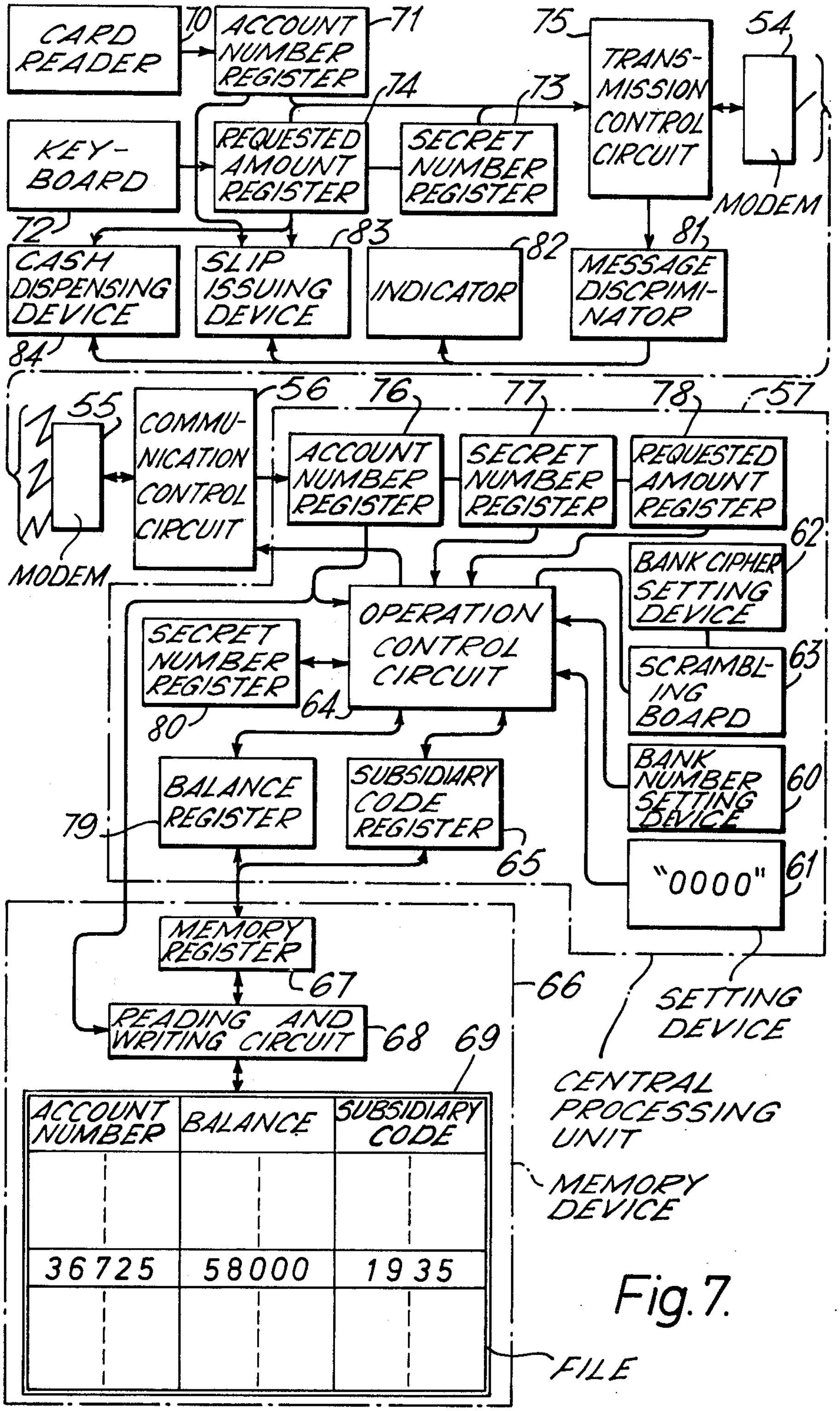
FIG. 7 is a block diagram of the on-line cash dispenser of FIG. 6.
Figure 9:
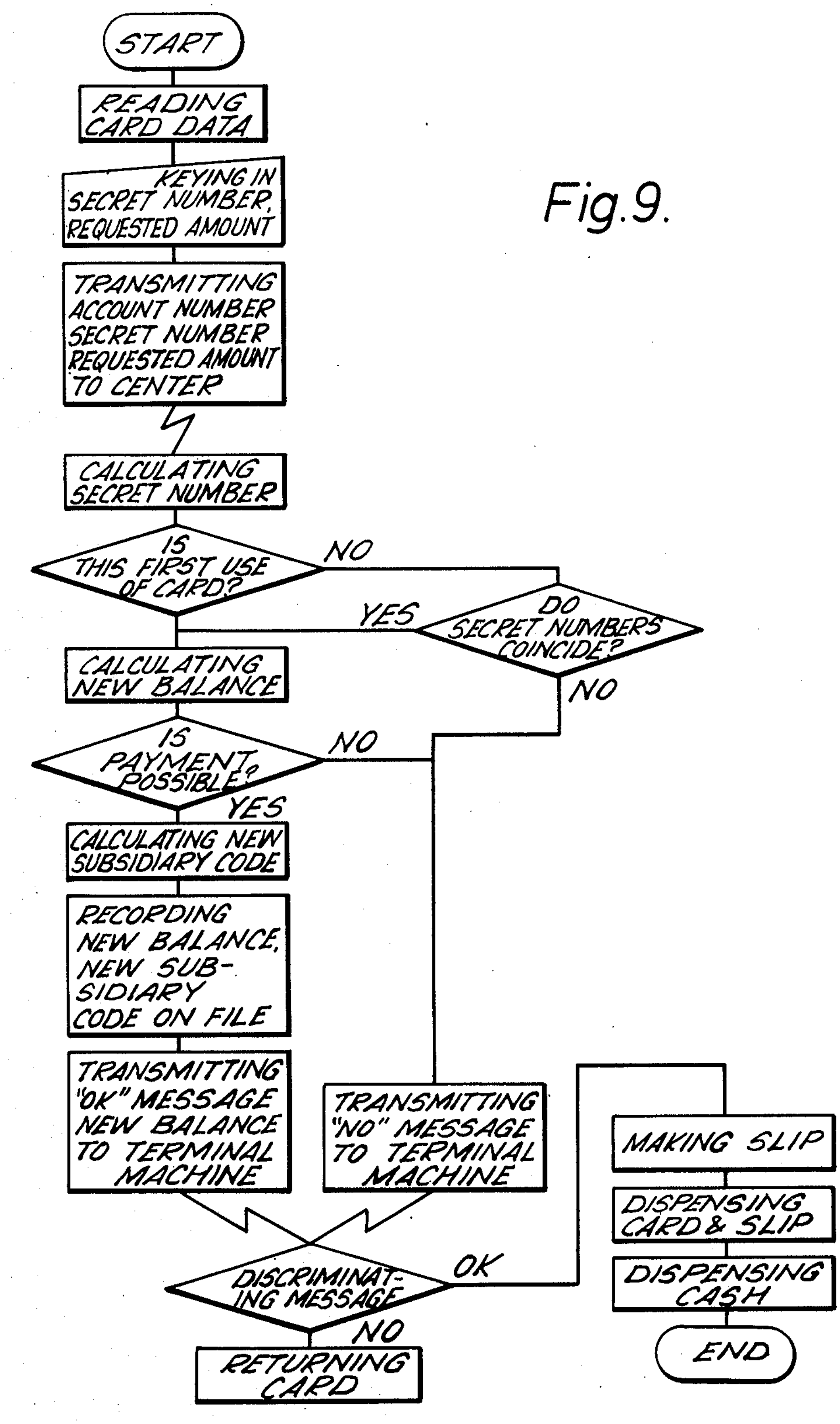
FIG. 9 is a flow chart for the operation of the on-line cash dispensr of FIG. 7.

In the on-line CD shown in FIG. 7 the card is put into the machine by the customer. The account number read from the card is stored in an account number register 71. Reference should be made also the flow chart shown in FIG. 9. The customer then manipulates a keyboard 72 to enter the secret number and the amount of money which he requests to be paid. The secret number and the requested amounts are once stored in secret number and requested amount registers 73 and 74, respectively, and then these data together with the account number stored in the account number register 71, are sent to a central station through a transmission control circuit 75 and a MODEM 54. At the central station, these data, that is, the account number, the secret number and the requested amount are applied through a MODEM 55 and a communication control circuit 56 to be stored in account number, secret number and requested amount registers 76, 77 and 78, respectively.

As previously mentioned in connection with the card issuing apparatus, the bank cipher H1 – H4 is produced by scrambling board 63 connected to the bank cipher setting device 62 and the bank number B1 – B4 is set in the setting device 60 and the balance R1 – R4 and the subsidiary code C1 – C4 are stored in the file 69. By the account number stored in the register 76 access is made to the file 69 so that the balance of the account and the subsidiary code are successively called through the reading and writing circuit 68 and the memory register 67 so as to be stored in the balance and subsidiary code registers 79 and 65, respectively, in the CPU 57.

The AR circuit 64 calculates a secret number Q1 – Q4 on the basis of the previously mentioned equations, and the calculated secret number is stored in a secret number register 80. Then the AR circuit 64 checks if the secret number stored in the secret number register 80 and the contents (all zeros) of the setting device 61 coincide.

If the contents of the secret number register 80 and those of the setting device 61 coincide, that is, if all the digits of the calculated secret number are 0, it means that the card is now being used for the first time, so that the new balance is calculated without checking the secret number sent from the terminal machine and stored in the secret number register 77.

If the contents of the secret number register 80 and the setting device 61 do not coincide, that is, if the calculated secret number is not all zeros, the card is recognized as having already been used before, that is, the present use of the card is not its first use, whereupon the AR circuit 64 compares the secret number sent from the terminal machine and stored in the secret number register 77 and the calculated secret number stored in the secret number register 80. If the two numbers do not coincide, it means improper use of the card, so that a payment rejection message is sent to the terminal machine. If they coincide, however, it means proper use of the card, so that the new balance is calculated as in the above case in which the card has been used for the first time.

The new balance is calculated by the AR circuit 64 which subtracts the requested amount stored in the requested amount register 78 from the existing balance stored in the balance register 79. If the result of the subtraction is negative, the balance is short of the requested amount so that a payment rejection message is sent to the terminal machine.

When the new balance has been calculated, the AR circuit 64 calculates a new subsidiary code C1 – C4 from the bank number set in the setting device 60, the account number stored in the account number register 76, the new balance stored in the balance register 79, the bank cipher provided by the scrambling board 63 and the secret number stored in the secret number register 77 on the basis of the previously mentioned equations. The calculated anew subsidiary code is stored again in the subsidiary code register 65.

Then the new balance stored in the balance register 79 and the new subsidiary code stored in the subsidiary code register 65 are successively recorded in the corresponding one of the recording areas in the file 69 which access is made by the account number stored in the account number register 76 in place of the previous data recorded therein.

Then the AR circuit 64 sends a payment permission message and the new balance to the cash dispenser through the communication control circuit 56.

The message sent from the central station through the MODEM 55, the MODEM 54 and the transmission control circuit 75 is checked by a message discriminating circuit 81. If the message is recognized as the payment rejection message, the card reader 70 returns the card it has until then been keeping and the indicator 82 indicates payment rejection.

If the message is recognized as the payment permission message. A slip issuing device 83 issues a slip on which the account number stored in the account number register 71, the requested amount (that is, the amount paid) stored in the requested amount register 74 and the new balance in the discriminating circuit 81 are printed. At the same time the card reader 70 returns to the customer the card on which the account number has been recorded. (The account number remains the same and is not changed.).

After the card has been returned, a cash dispensing device 84 dispenses the number of bills which correspond to the requested amount stored in the requested amount register 74.

Thus the explanation of the on-line CD and the card issuing apparatus used therewith has been completed.

The invention is not limited to the above embodiments, but there are various other modifications thereof such as follows:

1. As the parameters for calculating the secret number, the date of use of the card, the number of times of use of the card, etc. may be used individually or in combination instead of the balance. These parameters may be recorded on the card or a recording medium to which access is made by the card. In a POS (point of sales ) system, the balance may means the total of the prices of the articles the customer has purchased.

2. Besides the cash dispenser, the invention can be applied to a deposit machine, a POS system, or a security gate system, etc.

3. In the above embodiments in order to check whether the card is used for the first time a predetermined operation is conducted. Alternatively, when a card is issued, the code which directly means the first use of the card may be recorded on the card or a recording medium to which access is made by the card. When the card is used for the first time, the code expressing the first use of the card is erased or changed before returning the card to the customer.

4. The functions of the equations for calculating the secret number from the subsidiary code, etc. may be trigonometrical, square, cubic, or any other forms.

5. Even when the card is used for the first time, it is possible to check the secret number. In this case, the user of the card is recognized as the owner of the card, regardless of the result of the checking. This can be effected by merely changing the program.

6. For checking of the manually entered secret number, all the digits of the balance need not be used, but some of them, e.g. the lowest four digits alone may be used, or the complement of the number expressing the balance may also be used.

7. In the illustrated embodiments the secret number is entered when the card is used in the cash dispenser for the first time. This need not always be so, but an encoder for exclusive use by the customer himself may be provided so as to enable the customer to enter the secret number. Such an encoder may be incorporated into the card issuing device. In this case, it is neccessary to prevent the clerk in charge from seeing the secret number as the customer operates to enter the number into the machine.

8. In the illustrated embodiments, the secret number entered by the customer is not recorded as it is, but it is combined with other numbers as parameters. This arrangement helps to reduce the possibility of the secret number being known to other persons. It is of course possible to record the secret number as it is entered by the customer.

What we claim is:

1. A system for verifying the user of a card containing data comprising:

A. means for obtaining data from said card;

B. input means operable by the user of said card to input a secret number; and,

C. checking means connected to receive said data from said card and said secret number for:
1. manipulating said data read from said card to obtain derived data;
2. checking whether said derived data includes predetermined specific data; and,
3. recognizing said user as the proper user of said card if said predetermined specified data is found to exist, regardless of whether correspondence exists between said derived data and said secret number.

2. The system claimed in claim 1, wherein said predetermined specific data denotes the first use of said card.

3. The system claimed in claim 1, wherein said data is recorded on said card and said means for obtaining data from said card is a card reader for reading said data recorded on said card.

4. The system claimed in claim 1, wherein:
A. said data contained on said card includes an account number adapted to be read by said card reader; and,
B. said checking means includes:
1. memory means for storing further data, said further data being identified in said memory, and accessible by, account numbers; and
2. withdrawing means connected to said memory means for withdrawing from said memory means data stored therein related to an account number applied to said memory means by said withdrawing means.

5. The system claimed in claim 1, wherein said checking means includes:
means for producing said predetermined specific data, said predetermined specific data denoting the first use of said card; and
comparing means for comparing said derived data and said predetermined specific data.

6. The system claimed in claim 1, wherein said data obtained from said card comprises two different kinds of data; and wherein said checking means performs a predetermined mathematical operation on said two different kinds of data and said secret number.

7. The system claimed in claim 6, wherein one of said at least two different kinds of data represents the balance of the account of the user of said card.

8. The system claimed in claim 1, wherein said checking means includes means for setting a cipher and means for setting specific data denoting the first use of a card; and, wherein said checking means performs predetermined operations on said card data and said cipher to produce different data and compares said different data and said specific data.

9. A system for verifying the user of a card containing data comprising:
input means manually operable by said user for entering a secret number;
reading means for reading data contained on said card and for producing related card data;
checking means for determining if said card data denotes the first use of said card; and
control means responsive to said checking means determining that said card data denotes the first use of said card for causing said user to operate said manually operable input means to enter a secret number to be produced as card data when said card is used subsequent to said first use of said card.

10. The system claimed in claim 9, including setting means for setting a cipher and wherein said checking means determines whether said card is being used for the first time on the basis of said card data and said cipher.

11. A system for verifying the user of a card comprising:
A. a card issuing device including:
1. first calculating means for calculating a subsidiary code from at least useful data and a specific code; and
2. first recording means for recording said useful data and said subsidiary code on said card; and,
B. a card using device including:
1. checking means for determining whether said useful data and said subsidiary code recorded on said card define said specific code;
2. input means operable by use of said card to enter a secret number;
3. data producing means for producing new useful data for renewing said useful data;
4. second calculating means, responsive to said checking means determining that said useful data and said subsidiary code recorded on said card define said specific code, for calculating a new subsidiary code from said secret number and said new useful data; and,
5. second recording means for recording said new useful data and said new subsidiary code on said card.

12. The system claimed in claim 11, wherein said specific code denotes the first use of said card and said useful data includes the balance of the account of said user of said card.

13. A system for verifying the user of a card containing data comprising:
reading means for reading said card data;
data developing means responsive to said reading means for producing at least account balance data and a subsidiary code in accordance with the data read by said reading means;
input means, manually operated by said user, for producing a secret number;
checking means for manipulating said account balance data, said subsidiary code and said secret number to verify that the user of the card is entitled to use the card;
setting means for setting an amount of money for a monetary transaction;
calculating means for calculating new account balance data from said account balance data and said amount of money and a new subsidiary code from said new account balance data and said secret number; and,
storing means for storing said new account balance data and said new subsidiary code for use as said account balance data and said subsidiary code when said card is next used.

14. The system claimed in claim 13 including setting means for setting a cipher and wherein said checking means checks correspondence between said account balance data, said subsidiary code, said secret number and said cipher and said calculating means calculates a new subsidiary code from said new account balance data, said secret number and said cipher.

* * * * *